United States Patent [19]

Cornacchia

[11] Patent Number: 5,108,255
[45] Date of Patent: Apr. 28, 1992

[54] PALLETIZER AND DEPALLETIZER AND HEAD THEREFOR

[75] Inventor: Vincent Cornacchia, Paramus, N.J.

[73] Assignee: General Machine Design, Inc., Saddle Brook, N.J.

[21] Appl. No.: 629,052

[22] Filed: Dec. 14, 1990

Related U.S. Application Data

[63] Continuation-in-part of Ser. No. 357,402, May 25, 1989, abandoned.

[51] Int. Cl.⁵ .............................................. B65G 57/24
[52] U.S. Cl. ..................... 414/792.8; 901/16; 901/22; 414/744.2
[58] Field of Search ............. 414/792.9, 799, 792.8, 414/744.1, 744.2, 744.4; 901/16, 22, 30

[56] References Cited

U.S. PATENT DOCUMENTS

| | | | |
|---|---|---|---|
| 4,062,219 | 12/1977 | Chupara et al. | 901/22 X |
| 4,597,707 | 7/1986 | Cornacchia | 414/792 |

FOREIGN PATENT DOCUMENTS

| | | | |
|---|---|---|---|
| 0213383 | 9/1984 | German Democratic Rep. | 901/22 |
| 0045276 | 4/1981 | Japan | 901/16 |
| 0749659 | 7/1980 | U.S.S.R. | 901/22 |
| 0837849 | 6/1981 | U.S.S.R. | 901/22 |
| 1283083 | 1/1987 | U.S.S.R. | 414/744.2 |
| 1328188 | 8/1987 | U.S.S.R. | 901/22 |

*Primary Examiner*—Robert J. Spar
*Assistant Examiner*—William M. Hienz
*Attorney, Agent, or Firm*—Fred A. Keire; Mary Ann G. Mullen

[57] ABSTRACT

A palletizer or depalletizer of containers with a product carrier and product support having four pickup or deposit positions providing improved operational speeds and container placement precision. The ends of two air cylinders are slidably secured to at least one crank arm of a pivot shaft disposed in the carrier, actuation of the cylinders causing rotation of the shaft and the product support.

4 Claims, 5 Drawing Sheets

PALLETIZER AND DEPALLETIZER AND HEAD THEREFOR

This application is a continuation-in-part of U.S. application Ser. No. 07/357,402, filed May 25, 1989, now abandoned.

This invention relates to a palletizer as well as a depalletizer; more specifically, this invention relates to a precision stacking or destacking of containers on a pallet. Still further, this invention relates to a combination that allows the stacking and destacking, that is, palletizing and depalletizing, of various goods in a more precise and accurate manner as a result of providing an improved pickup head for such a machine. Consequently, this invention relates to a combination of a palletizing and depalletizing machine with a particular head to obtain improved results flowing from this combination.

BACKGROUND FOR THE INVENTION

In the palletizing and depalletizing of loads, great advances have been made by the employment of machines that accomplish this stacking and destacking of various containers on the pallet. Containers may be of various types, such as wrapped bundles of goods, that is, individually or assembly wrapped in a plastic film; corrugated boxes of various kinds; bags; cans; sacks and containers of various types. Thus containers in which goods typically are shipped are included, but the most prevalent type is the rectangular type of container.

Today's production schedules are such that extremely versatile machines are desired so that various containers of different dimensions and/or different sizes and shapes may be stacked or destacked by the same machine at high rates and with great precision. The changeover time from one package type to another or from one container type to another must be kept at a minimum in order for the machine to be efficiently employed.

Consequently, the present invention seeks to answer the problems encountered, which problems have arisen because of the greater need for higher speed and more precise packing of goods on a pallet or other such platform on which the goods may be stacked.

This invention relates more particularly to my previously granted U.S. Pat. No. 4,597,707.

In that patent, I disclose the automatically operating palletizer which has outstanding characteristics and has gained great acceptance by the industry to where a great number of these machines are now used.

In this patent a number of prior art attempts have been illustrated, and this patent provides the most convenient prior art summation of the present invention.

BRIEF DESCRIPTION OF THE INVENTION

As discussed above, in my previous U.S. Pat. No. 4,597,707 I have disclosed an automatically operating palletizer which has now been further improved by combining the same with a novel and highly precise pickup head, thereby extending the range of useful applications for this machine and providing great benefits in the use of the machine in precision stacking and destacking of various loads, e.g., on a pallet.

As a result of the present improvements, outstanding motion characteristics have been provided for the machine such that the speed as well as placement of the individual containers may be greatly improved.

These applications are especially needed where the material to be placed on a pallet has a slightly irregular shape, but the irregular shape can be used to a greater advantage to provide for an interlocking pattern of the material on a pallet. Loads stacked in this manner provide high load integrity, and pallet load behavior is greatly improved. Among such applications one is especially interesting, i.e., in the palletizing of magazines, books and the like, of which a number are assembly wrapped in plastic material and which have an irregular shape to the thus wrapped "container" as a result of the binding on the books or magazines being thicker. By appropriately placing, for example, the binding side of this "container" on the outside of the load, the load characteristics on a pallet are greatly enhanced because the present machine allows the appropriate placement of the magazines with the binding being on the outside by providing a pickup and assembly which can pivot not only through 90°, but also through 180° and/or 270°.

The above features and advantages of this invention will be provided in the following detailed description and illustration of these embodiments. These are to be read in connection with the accompanying drawings, wherein:

FIG. 1 is a perspective view of an automatically operating palletizer-depalletizer constructed in accordance with the present invention but showing the pickup head arrangement of my prior patent, U.S. Pat. No. 4,597,707;

DETAILED DESCRIPTION OF THE INVENTION AND EMBODIMENTS THEREOF

Figure 1:
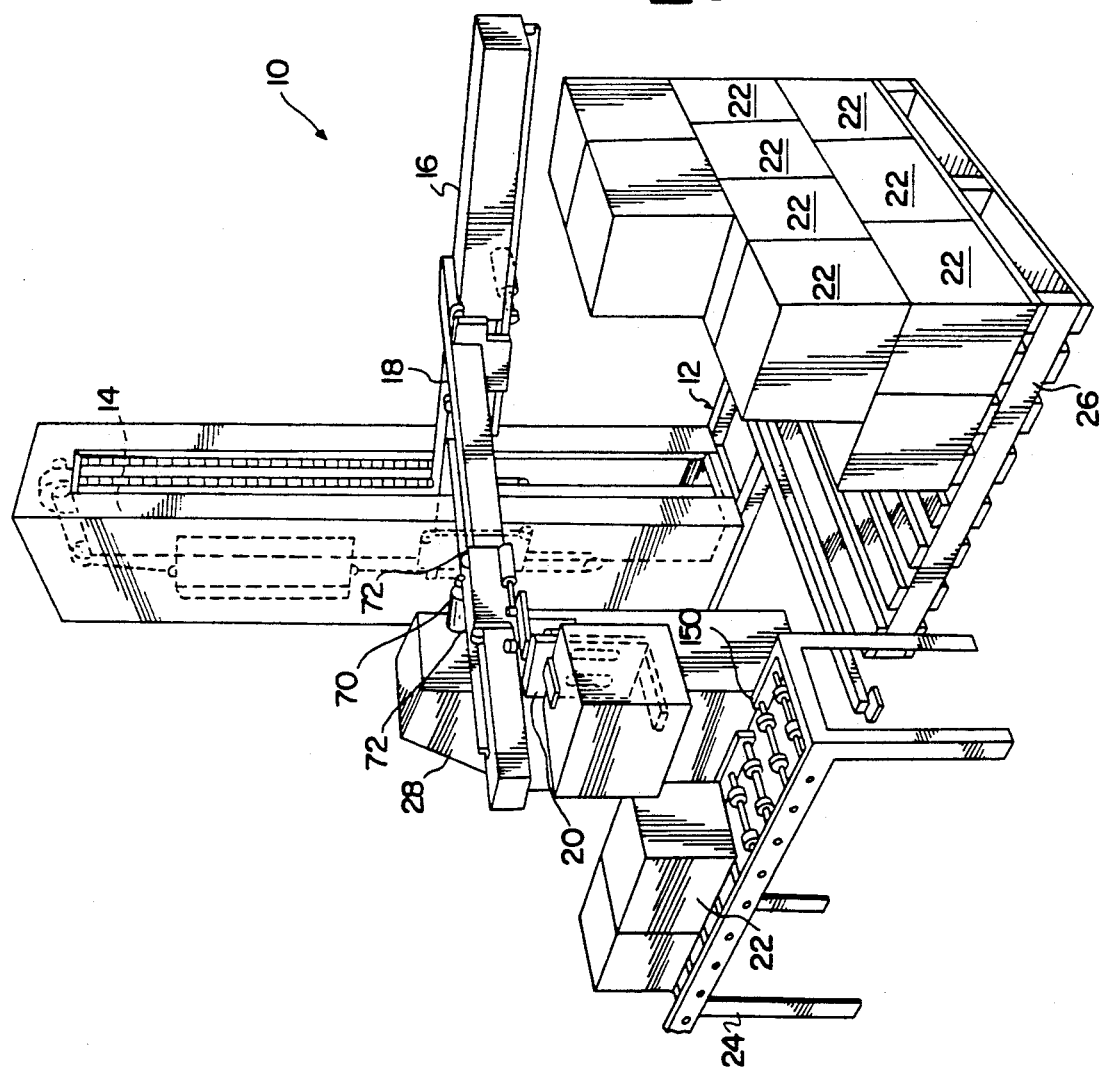

Referring now to the drawing in detail, and initially to FIG. 1 thereof, an automatically operating palletizer 10 constructed in accordance with the present invention is illustrated. The palletizer includes a support frame 12 having an independent, fixed and stationary vertical support column 14 on which a horizontally extending support beam 16 is slidably mounted for vertical movement. A product support beam 18 is slidably mounted on beam 16 and extends perpendicularly to beam 16. The product support beam 18 is adapted to be moved, as described in my U.S. Pat. No. 4,597,707, along the length of beam 16. A product carrier or pickup head 20 is slidably mounted on product support beam 18, secured thereto in any convenient manner, and can be advantageously driven along the length of that beam to any of a plurality of predetermined positions. My prior patent, U.S. Pat. No. 4,597,707, discloses in detail the mounting and drive arrangement for the beams 16 and 18 as well a the mounting and drive of head 20 along the beam 18. The disclosure of the patent relating to such mounting and drive arrangements is incorporated herein by reference.

Pickup head 20 has a clamp arrangement which enables it to pick up individual packages 22 from a conveyor 24 at the end of a product packaging line. The palletizer operates to lift the package from a conveyor 24 and move it onto a pallet 26 in accordance with a predetermined and preprogrammed stacking pattern. While cartons 22 are illustrated in the drawing as being the containers of choice, the palletizer can also be used to stack bags, sacks, drums, cans or the like. Moreover, it can be used to remove the same items, in which case it works as a depalletizer.

The product carrier or pickup head 20 of the present invention has a facility for pickup now which allows pivoting through 90°, 180°, 270°, or 360° from the standing position wherein it extends generally parallel to product support beam 18, to a position perpendicular thereto to a position opposite where it is picked up or a ¼ turn from the position where the container is picked up. As a result, the packages can be stacked in one of four positions (i.e., pickup position; after 90° rotation; after 180° rotation, and after 270° rotation) in order to interlock the packages in accordance with common palletizing procedures. These advantages will be further described herein.

Palletizer 10 includes an automatic control system 28 which is preprogrammed and/or reprogrammable in order to permit the operator to determine the desired stacking pattern. Preferably the control system is of the computerized and/or numerical control type, the last such as is commonly used in machine tool centers wherein accurate positioning of tools in three dimensions is required. The programming, therefore, may be modified for a specific application, but the specific programming of these controls does not form any part of this invention and would be within the skill of those in the art of computerized or numerical control systems or like computer driven operations.

Returning to FIG. 1, product support beam 18 is slidably mounted on the horizontal support beam 16. A carriage 70 is rigidly formed, by welding or the like is adapted to move along support beam 18. This carriage 70 is a generally square sleeve having a plurality of guide roller structures 72 located at its four corners to permit the carriage to roll along the surface of the support beam 18 as shown in my previous U.S. Pat. No. 4,597,707 and illustrated also in FIG. 2.

Figure 2:
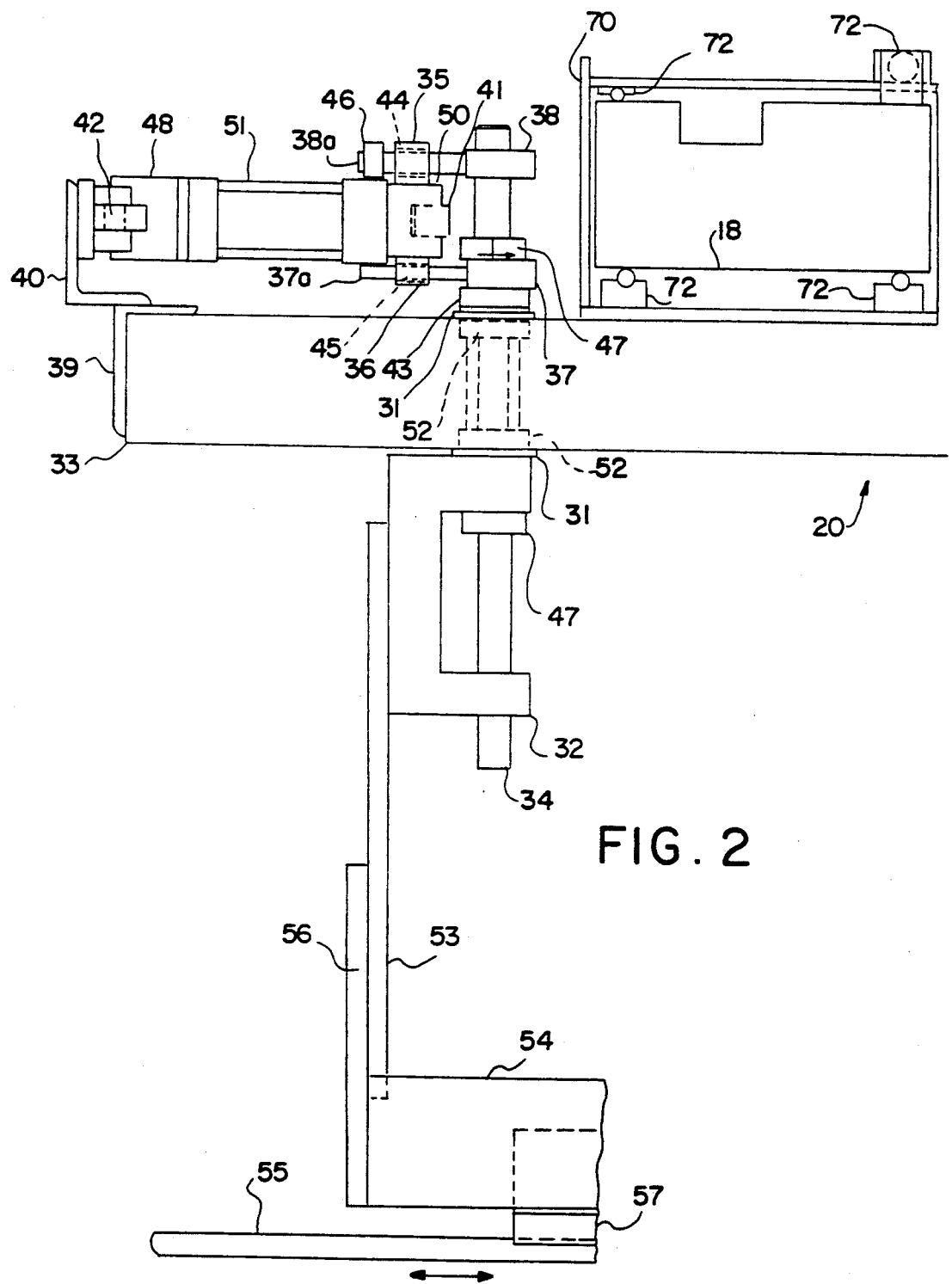
FIG. 2 is a side elevational view of the pickup head of the present invention used in conjunction with the apparatus shown in FIG. 1, having a capability of 180° rotation.

Turning now to FIG. 2, it illustrates the pickup head 20 constructed in accordance with the present invention with an arrangement suitable for turning the pickup head fingers 55 for lifting the packages off the load or placing these on the load through 180°. As shown in side view in this Figure, the product support beam 18 carries the carriage 70 thereon. Carriage 70, in turn, runs on bearings 72 on product support beam 18. Onto carriage 70 is welded thereto pickup head beam 33. In turn, pickup head beam 33 carries a pair of thrust bearings 31 therein. One is a lower thrust bearing, and another one is an upper thrust bearing on the pickup beam, but since these function in the same manner, these have been identified by the same numerals. At the lower surface of pickup head beam 33, a C-frame 32 provides support for the container pickup frame 53 which may be slidably removed from pickup head pivot shaft 34. An appropriate substitution of any suitable device for a particular container pickup frame 53 is accomplished by removing collar 37. It is especially desirable when different packages need to be palletized or depalletized, and a particular adaption of a container pickup frame 53 is needed to suit a particular container.

Figure 3:
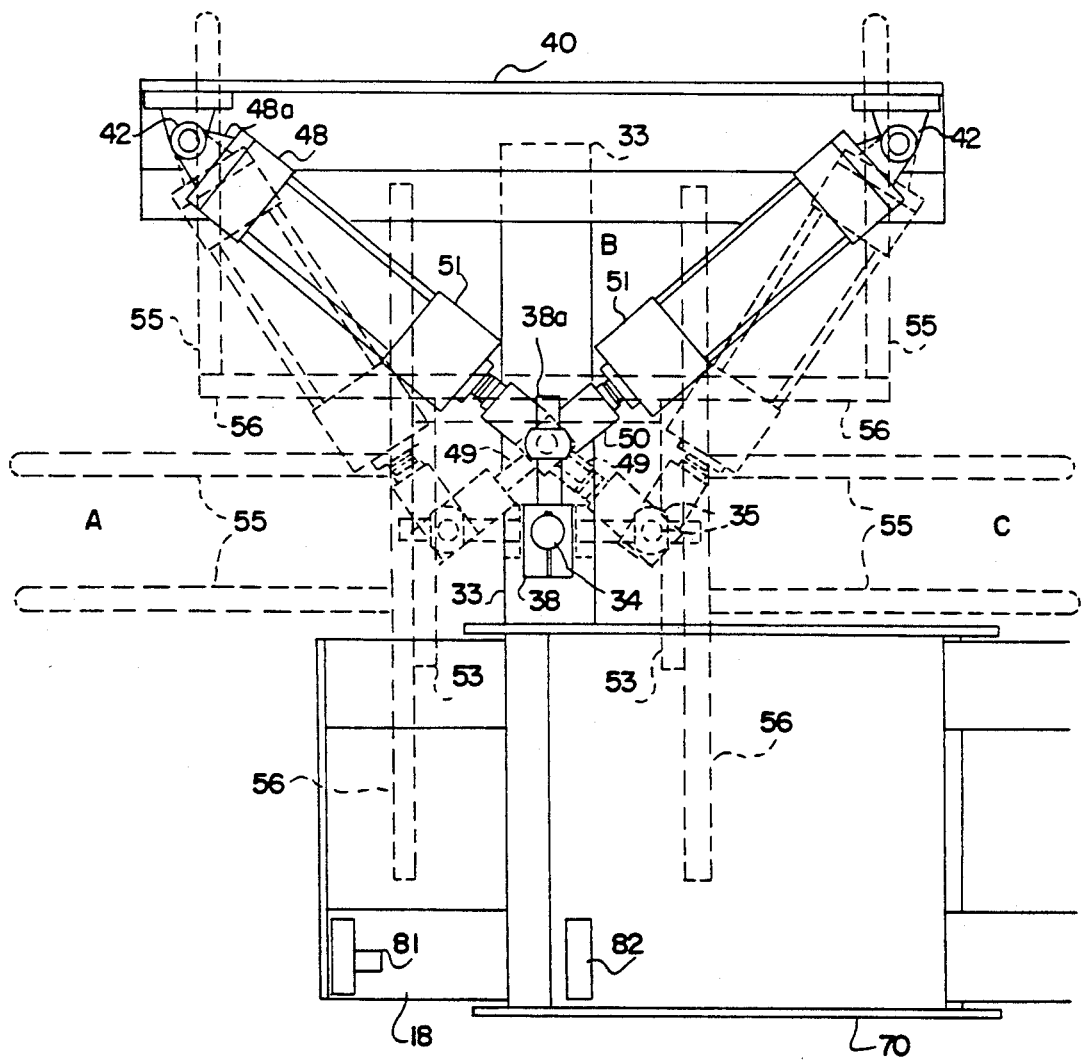
FIG. 3 is a top plan view of the pickup head shown in FIG. 2.

A type of a pickup head has been shown in FIG. 2 and another in top view in FIG. 3, and these distinctions will be further explained herein.

FIG. 2 discloses an arrangement allowing movement through 180°. The advantage of this arrangement is added strength and durability achieved by both upper crank 38 and lower crank 37.

A female swivel pin 35 on cylinder 51 rod head 50 connects upper bushing 44 to cylinder 51 rod head 50. Upper bushing 44 slides along upper crank arm 38a until stopped by stop collar 46 mounted on upper crank arm 38a. Bushing 44 for upper crank arm 38a allows the female swivel pin 35 to move along the upper crank arm 38a in a smooth, nonbinding fashion.

The lower swivel pin 36 mounted on lower crank arm 37a with lower bushing 45 likewise provide for smooth movement along the crank arm 37a. Cylinder head bracket 41 interconnection with rod head 50 of the cylinder 51 provides a variable-sliding yoke assembly for the two interconnecting cylinders 51, as shown in top view in FIG. 3, for reasons which will be further explained herein. An angle piece 40 has been provided for mounting ball bearing 42 for cylinder 51 pivot foot 48. A thrust bearing 43 allows the shaft 34 to be driven smoothly upon imparting cranking motion by cylinder 51 to lower crank 37 and upper crank 38. Crank 37 also acts as a collar. Collar 37 on shaft 34 supports the shaft 34 in the embodiment shown in FIG. 2. The cylinder foot pivot bracket 48, as previously discussed, allows the toggling of the entire assembly upon cranking, i.e., upon extension and retraction of cylinder rod 49 shown in FIG. 3 (not shown in FIG. 2). Additional lower and upper ball bearings 52 may be provided for shaft 34 to aid the thrust bearings 31. Turning now to FIG. 3, it illustrates the three positions achieved with the device illustrated in FIG. 2. These are a pickup position, a position which is 90° from a pickup position, and one which is 180° from a pickup position, as shown in this Figure upon clockwise rotation of the same.

In my previous U.S. Pat. No. 4,597,707, I had disclosed a rack and pinion arrangement for the rotation as an embodiment therein. In my experience it has been found that a rack and pinion arrangement causes excessively slow startup with a rapid motion buildup, and then a backlash upon stopping the motion. This, in turn, translates into a motion curve, i.e., rate in degrees of turn radians versus time, which is very undesirable for fast, precise packaging. As this motion curve throughout the cycle is not continuous, but has unwanted slow acceleration, fast acceleration, and then backlash characteristics, it has, in effect, been a limiting condition for achieving greater speeds and more precise packaging. In addition, mechanically the rack and pinion device is also very complicated because excessive mechanical wear results from the irregular motion curve. Still further, in order to achieve high precision for the placement of packages, machining of a device which would provide such precision and/or the control of the motion is expensive and still does not achieve the results provided for the novel device as shown in FIGS. 2 and 3.

In my present invention smooth motion which does not jerk or suddenly dislocate a load to be palletized or depalletized is achieved through the connection of cylinder rod head 50 to crank arm 37a by swivel pin 36 and bushing 45. The distance in which bushing 45 travels determines the angular speed imparted to the load to be palletized or depalletized. While cylinders 51 always move at constant speed, although independently of one another, the angular speed of the load varies so that there is a slow acceleration from the pickup position to a maximum angular speed which remains constant until 45° before the desired unloading position, and then a deceleration to the unloading position. Thus, the angular momentum of the load is diminished before stopping, eliminating the jerk or backlash of the load.

In the device shown in FIGS. 2 and 3, the three positions have been identified as "A", "B" and "C" and are at 9 o'clock, 12 o'clock and 3 o'clock in FIG. 3 as shown. As cylinders 51 are of the push-pull type, upon initiation of the motion from position A to position B, the righthand cylinder initiates the pull with the lefthand cylinder being in an idle position. The rod 49 for the righthand cylinder travels substantially linearly in the pull mode up to the time when the dead center is reached, signified by position "B". The crank arm length 37a and 38a changes providing smooth, nonlinear motion due to the change of the length of the crank arm. However, upon reaching the dead center and activation of the lefthand cylinder 51, the push motion of the lefthand cylinder causes again the second part of the motion to achieve the position C to be substantially linear with respect to the rod 49 travel, but somewhat nonlinear with respect to the crank arm length. By appropriately adjusting the stroke velocity, i.e., both the pull-push velocity and force of each of the lefthand an righthand cylinders 51, a motion curve may be appropriately smoothed. This motion curve, i.e., a plot of velocity in radians versus time, is fairly important when a container is being sought to be moved in a precise manner after it has been picked up from a conveyor such as shown in FIG. 1 where containers 22 are deposited on pallet 26. The desirable point is that if the motion is not jerky, very precise placement of a package may be achieved at high rates of palletizing or depalletizing speeds. Consequently, while the motion from position "A" to position "B" is not as severe and can be appropriately controlled, the entire 180° motion is fairly severe and must be fairly carefully controlled so that a container such as 22 may be appropriately placed on the pallet at a higher rate of speed and moved where desired without excessive travel by product support beam 18 or as it travels along beam 16. Thus there is considerable saving in the motion of the machine if it has the added capability of 180° in a smooth fashion and, moreover, if the 270° rotation is in an equally smooth fashion. This added feature has provided in the combination considerable savings in time which have been previously lost in the travel that can now be saved by being able to have the added positions for the pickup head 20. Additionally, full 360° rotation saves time in that initial starting position can be reached quickly by simply turning another 90° from a 270° position where a load may be palletized or depalletized eliminating the necessity of rotating back 270° to the starting position. These savings over a single pallet and a number of pallets amount to considerable savings in packaging achieved at improved precision and great reliability.

Figure 4:
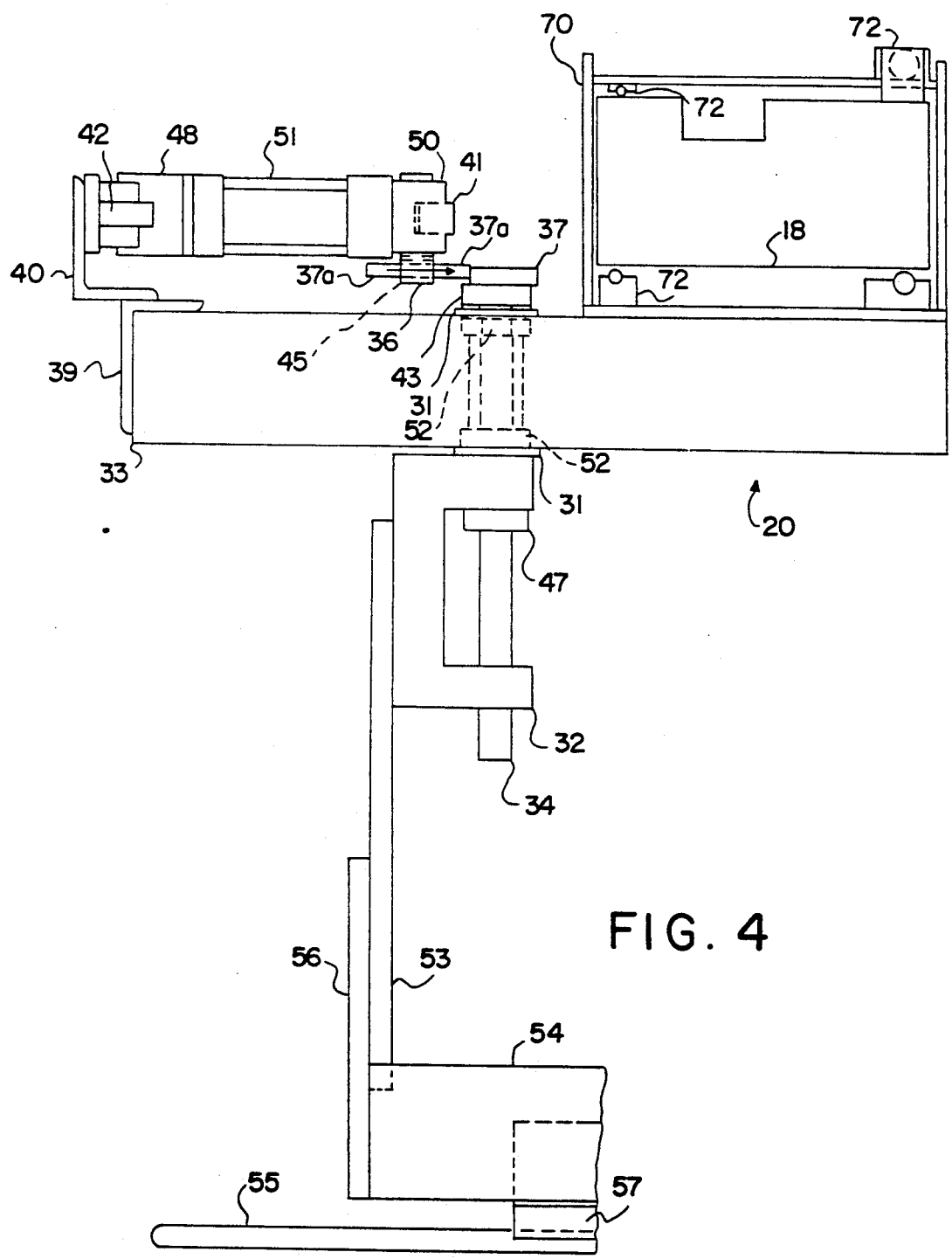
FIG. 4 is a side elevational view of the pickup head capable of full 360° rotation used in combination with the machine shown in FIG. 1.

In FIG. 3 in top view, the carriage 70 stop 82 is provided in combination with a spring stop 81 provided on support beam 18. Turning now to FIG. 4, wherein like elements have been illustrated by like number, this Figure shows the capability of rotating shaft 34 through 360° because only the lower crank 37 with crank arm 37a has been provided so that cylinders 51 can move in the three positions possible as needed for 180° movement and four positions as needed for 270° movement over the pickup head pivot shaft 34. In this instance, the crank 37 acts also as a collar on shaft 34 by being appropriately fixed thereto. An appropriate stop device on crank arm 37a may also be provided (not shown in FIG. 4). Again, by appropriately adjusting the push-pull timing or motion curve control by means of pneumatic control devices providing air to the lefthand and righthand cylinders 51, the motion may be appropriately controlled. These devices have not been shown, but these are within the skill of the art based on the motion characteristics that one wishes to impart for the entire cranking range in a 270° cranking motion.

As illustrated, this cranking motion then provides the desired characteristics for a proper placement, such as magazines or books, which have one edge higher than the other when wrapped in a plastic bundle. By having the bindings placed on the outside on pallet 26, i.e., on the outer periphery of the load and appropriately placed within the inside of the pallet, great load integrity has been achieved such that the inherent stability of the load is greatly improved and at the same time no sacrifice is made in the time within which this load may be formed.

Figure 5:
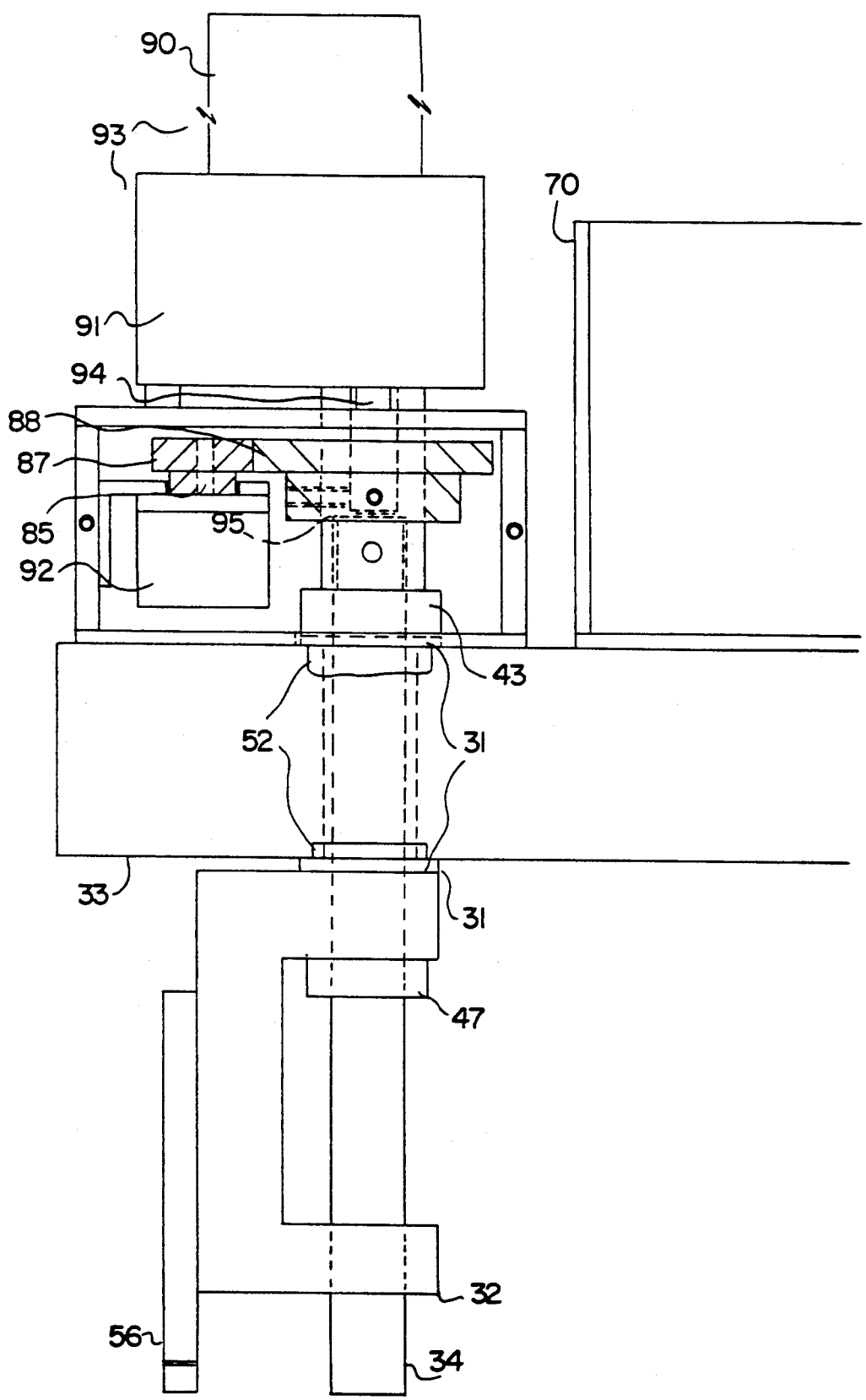
FIG. 5 is a side elevational view of the pickup head the alternate embodiment using a DC rotation through 360°.

FIG. 5 shows an alternate embodiment which utilizes a motor 90 to rotate drive shaft 94 which is coupled with coupling to pickup head pivot shaft 34. A DC motor 90 is preferred because of its ability to produce large torque under load without using excessive current. The encoder 92 is preferably an incremental encoder which is used to measure angular velocity of the coupling 95, and therefore of pivot shaft 34, but an absolute encoder may also be used.

Motor 90 is fixedly attached to gear box 91 which together comprise the gear motor 93, an arrangement which is well known in the prior art. The gear motor 93 causes rotation of drive shaft 94 which is coupled to pickup head pivot shaft 34 with coupling 95. Coupling 95, in turn, is partially housed in gear drive 88 which rotates at the same speed as drive shaft 94 and pivot shaft 34. A measurement of the angular velocity is attained through the cooperation of drive gear 88 with gear 87 which produces rotation of spindle 85 which is detected by an electronic counter within the encoder 92, thus eliminating the need for a tachometer to produce feedback of the angular velocity. The signals are then sent to the preprogrammed computer (not shown) which may in turn modify the output of gear motor 93 to achieve a desired acceleration or deceleration.

Turning now to the various pickup finger arrangements, one type has been shown in FIG. 1 where the pickup head finger 55 is substantially in the form of a plate 55. This device fits between the conveyor rollers in the notch identified as 150 in FIG. 1. In another embodiment shown in the top view in FIG. 3, pickup head fingers 55 in positions "A" and "C" have been shown only for the interior fingers, and in position "B" for the exterior pickup head fingers 55; a greater or lesser number may be used depending on the container being handled. These fingers are attached directly to the finger attachment plate 56. In FIGS. 2 and 4, the finger attachment plate 56 may have pickup head bottom bracket 54 which may carry a slidable part 57 to which pickup fingers 55 may be attached. An air cylinder (not shown) may extend and retract the finger attachment plate 56 and thus the fingers 55, so that the load may be depalletized when fingers 55 reach the appropriate position on a container such as 22, as shown in FIG. 1. In such operating mode the containers 22 are then removed from the pallet and placed on the conveyor 24. An appropriate vacuum suction cups (not shown), operated in the manner such as provided for by a clamp in my above-mentioned U.S. Pat. No. 4,597,707, may be used to lift a package 22 ever so slightly to aid in the entry of the pickup head fingers 55.

It has been shown that the advantages achieved by the use of the improved palletizer and depalletizer are great. Hence, it becomes fairly evident that the functions that the improved machine may perform provide great savings in machine time as a result of the additional motion saving operational modes for the machine 10. These motion saving modes are possible because of the very smooth operation of the pickup head 20. Consequently, accurate placement of a container(s) may be achieved at higher speeds heretofore not possible or, if possible, then at great sacrifice of load quality and integrity. In addition to the benefits which have thus been achieved, the previously described machine has further contributed to the art of high speed precision palletizing and depalletizing.

Although illustrative embodiments of the invention have been described with reference to the accompanying drawings, it is to be understood that the invention is not limited to those precise embodiments, and that various changes and modifications may be effected therein by those skilled in the art without departing from the scope or the intent by which this invention is offered in further contribution to this art.

What is claimed is:

1. An automatically operating palletizer or depalletizer comprising an independent fixed and stationary vertical support column, a horizontally positioned support beam, means for movably mounting said horizontal support beam on said support column for vertical movement in a fixed vertical plane relative to said support column; a horizontally extending product support beam, means for movably mounting said product support beam on said horizontal support beam perpendicularly to the horizontal support beam for movement along the length of the horizontal support beam; a product carrier movably mounted on said product support beam for movement along the length of the product support beam, drive means for driving said horizontal support beam and said product support beam to a plurality of vertical and horizontal positions, respectively, relative to said support column, and means for driving said product carrier along said product support beam for positioning said product carrier at any of a plurality of predetermined positions in three-dimensional space; said product carrier including product support means pivotally mounted on said product carrier and means for pivotally moving said product support means between a first position and a plurality of other positions to selectively deposit an article on the product support means in a predetermined location; said means for pivotally moving said product support means including a pivot shaft secured to said product support means and pivotally mounted on the product carrier, at least one crank arm secured to said pivot shaft, and a pair of rams having first ends pivotally mounted on the product carrier and opposite ends slidably mounted on said crank arm; said rams being positioned in substantially the same plane and at an angle to each other of less than 180°, whereby upon operation of said rams said product support means is rotated from said first position through at least 90°.

2. An automatically operating palletizer or depalletizer as defined in claim 1, wherein said product support means includes movable fingers.

3. An automatically operating palletizer or depalletizer as defined in claim 2, wherein said product support means includes means for extending and retracting said movable fingers.

4. An automatically operating palletizer or depalletizer as defined in claim 1, wherein said rams comprise air cylinders one of which is arranged to pull on said crank while the other pushes.

* * * * *